United States Patent
Li et al.

(10) Patent No.: US 7,570,689 B2
(45) Date of Patent: Aug. 4, 2009

(54) ADVANCED RECEIVER WITH SLIDING WINDOW BLOCK LINEAR EQUALIZER

(75) Inventors: Bin Li, Ronkonkoma, NY (US); Robert A. DiFazio, Greenlawn, NY (US); Jung-Lin Pan, Selden, NY (US); Alexander Reznik, Titusville, NJ (US); John David Kaewell, Jr., Jamison, PA (US); Peter Edward Becker, Coatesville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 494 days.

(21) Appl. No.: 11/238,318

(22) Filed: Sep. 29, 2005

(65) Prior Publication Data

US 2006/0227886 A1    Oct. 12, 2006

Related U.S. Application Data

(60) Provisional application No. 60/696,922, filed on Jul. 6, 2005, provisional application No. 60/652,790, filed on Feb. 14, 2005.

(51) Int. Cl.
*H04L 25/49* (2006.01)
*H04L 27/04* (2006.01)
*H03H 7/30* (2006.01)

(52) U.S. Cl. .................. 375/229; 375/297; 375/240.02

(58) Field of Classification Search ......... 375/229–236, 375/240.02–240.07, 297, 312
See application file for complete search history.

(56) References Cited

U.S. PATENT DOCUMENTS

| | | | | |
|---|---|---|---|---|
| 5,319,677 | A | * | 6/1994 | Kim ............................ 375/347 |
| 6,154,487 | A | * | 11/2000 | Murai et al. ................. 375/150 |
| 6,370,190 | B1 | | 4/2002 | Young et al. |
| 6,775,329 | B2 | | 8/2004 | Alamouti et al. |
| 7,006,840 | B2 | * | 2/2006 | Bultan et al. ................ 455/502 |
| 7,330,505 | B2 | * | 2/2008 | Fitton et al. ................. 375/229 |
| 2002/0014983 | A1 | * | 2/2002 | Honkanen et al. ........... 341/147 |

(Continued)

OTHER PUBLICATIONS

Guo et al., "Scalable FPGA Architectures for LMMSE-based SIMO Chip Equalizer in HSDPA Downlink", Conference Record of the Thirty-Seventh Asilomar Conference on Signals, Systems and Computers, vol. 2, Nov. 2003, pp. 2171-2175.

(Continued)

*Primary Examiner*—David C Payne
*Assistant Examiner*—Linda Wong
(74) *Attorney, Agent, or Firm*—Volpe and Koenig, P.C.

(57) ABSTRACT

A receiver or an integrated circuit (IC) incorporated therein includes a fast Fourier transform (FFT)-based (or hybrid FFT-based) sliding window block level equalizer (BLE) for generating equalized samples. The BLE includes a noise power estimator, first and second channel estimators, an FFT-based chip level equalizer (CLEQ) and a channel monitor unit. The noise power estimator generates a noise power estimate based on two diverse sample data streams. The channel estimators generate respective channel estimates based on the sample data streams. The channel monitor unit generates a first channel monitor signal including truncated channel estimate vectors based on the channel estimates, and a second channel monitor signal which indicates an approximate rate of change of the truncated channel estimate vectors. The FFT-based CLEQ generates the equalized samples based on the noise power estimate, one-block samples of the first and second sample data streams, the channel estimates and the monitor signals.

30 Claims, 8 Drawing Sheets

U.S. PATENT DOCUMENTS

| | | | |
|---|---|---|---|
| 2003/0076908 A1* | 4/2003 | Huang et al. | 375/350 |
| 2004/0101072 A1 | 5/2004 | Fitton et al. | |
| 2004/0248602 A1* | 12/2004 | Demir et al. | 455/502 |
| 2005/0025267 A1* | 2/2005 | Reznik et al. | 375/346 |
| 2006/0056496 A1 | 3/2006 | Smee et al. | |
| 2006/0109897 A1* | 5/2006 | Guo et al. | 375/232 |
| 2006/0159201 A1* | 7/2006 | Blasco Claret et al. | 375/330 |
| 2008/0260013 A1* | 10/2008 | Heikkila | 375/229 |

OTHER PUBLICATIONS

3$^{rd}$ Generation Partnership Project, "Technical Specification Group Radio Access Network; Physical Channels and Mapping of Transport Channels onto Physical Channels (FDD) (Release 5)", 3GPP TS 25.211 V5.5.0, Sep. 2003.

Guo et al., "Scalable FPGA Architectures for LMMSE-based SIMO Chip Equalizer in HSDPA Downlink", Conference Record of the Thirty-Seventh Asilomar Conference on Signals, Systems and Computers, vol. 2, Nov. 2003, pp. 2171-2175.

3$^{rd}$ Generation Partnership Project, "Technical Specification Group Radio Access Network; Physical Channels and Mapping of Transport Channels onto Physical Channels (FDD) (Release 5)", 3GPP TS 25.211 V5.5.0, Sep. 2003.

* cited by examiner

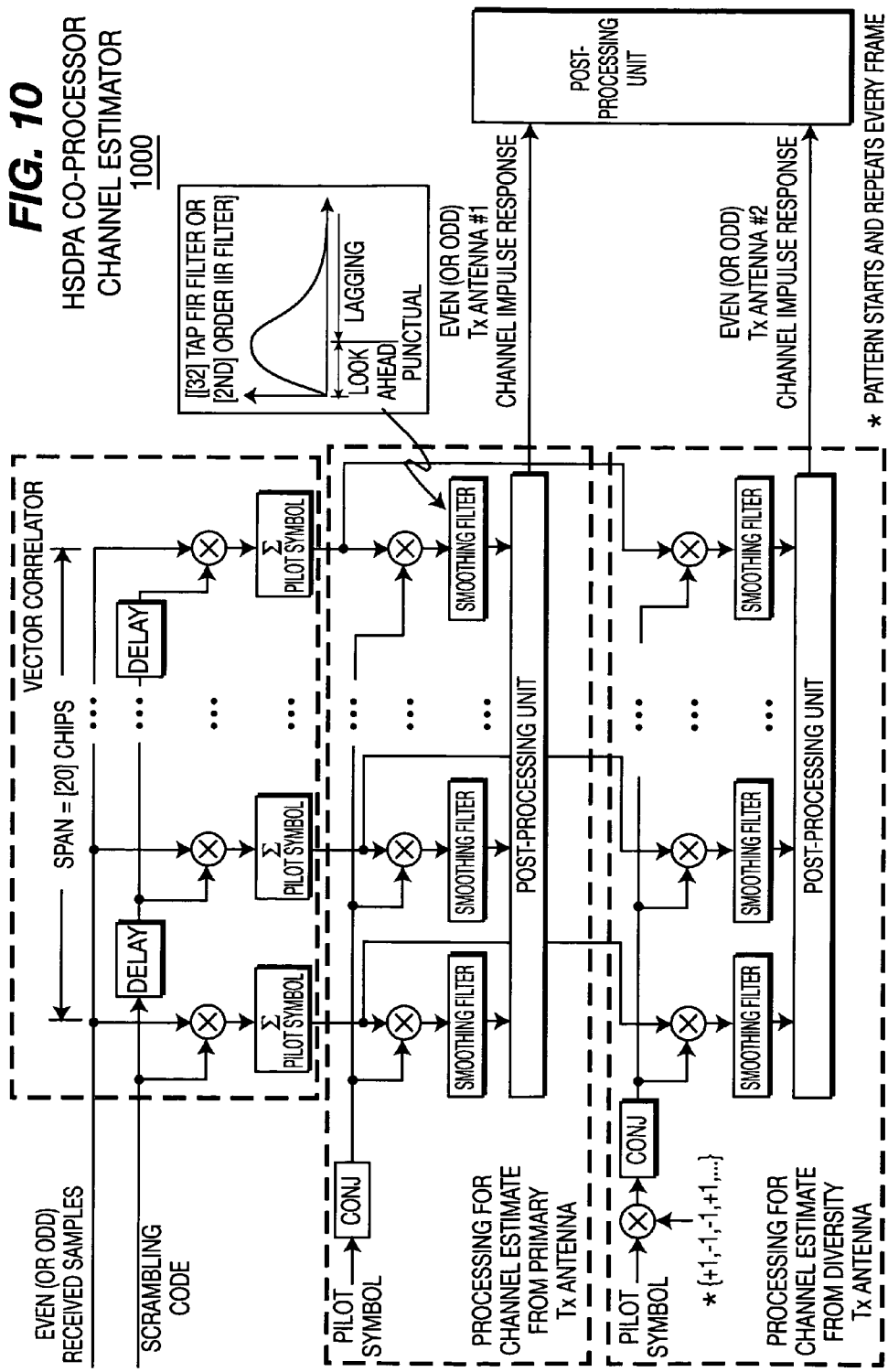

ADVANCED RECEIVER WITH SLIDING WINDOW BLOCK LINEAR EQUALIZER

CROSS REFERENCE TO RELATED APPLICATIONS

This application claims the benefit of U.S. provisional application No. 60/652,790 filed Feb. 14, 2005 and U.S. provisional application No. 60/696,922 filed Jul. 6, 2005, which are incorporated by reference as if fully set forth.

FIELD OF INVENTION

The present invention is related to a code division multiple access (CDMA) receiver used in a wireless communication system. More particularly, the present invention is related to a high speed downlink packet access (HSDPA) receiver, such as one used in a wireless transmit/receive unit (WTRU) or a base station, which uses fast Fourier transform (FFT) processing techniques.

BACKGROUND

There are a variety of receiver algorithms that may be considered as being improvements over a conventional Raked-based CDMA receiver. These receiver algorithms generally involve significant additional computational complexity which leads to implementations that require more components, more software cycles and more power. In turn, the additional computational complexity ultimately leads to higher cost WTRUs and shorter battery life. It is desired to optimize receiver performance by using the improved algorithms while at the same time minimizing or eliminating the additional computational complexity.

SUMMARY

The present invention is related to a receiver or an integrated circuit (IC) incorporated therein which includes an FFT-based (or hybrid FFT-based) sliding window block linear equalizer (BLE) for generating equalized samples. The BLE includes a noise power estimator, first and second channel estimators, an FFT-based chip level equalizer (CLEQ) and a channel monitor unit. The noise power estimator generates a noise power estimate based on two diverse sample data streams. The channel estimators generate respective channel estimates based on the sample data streams. The channel monitor unit generates a first channel monitor signal including truncated channel estimate vectors based on the channel estimates, and a second channel monitor signal which indicates an approximate rate of change of the truncated channel estimate vectors. The FFT-based CLEQ generates the equalized samples based on the noise power estimate, one-block samples of the first and second sample data streams, the channel estimates and the monitor signals.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 10 is a block diagram of an HSDPA co-processor channel estimator in accordance with the present invention.

DETAILED DESCRIPTION OF THE PREFERRED EMBODIMENTS

Figure 1:
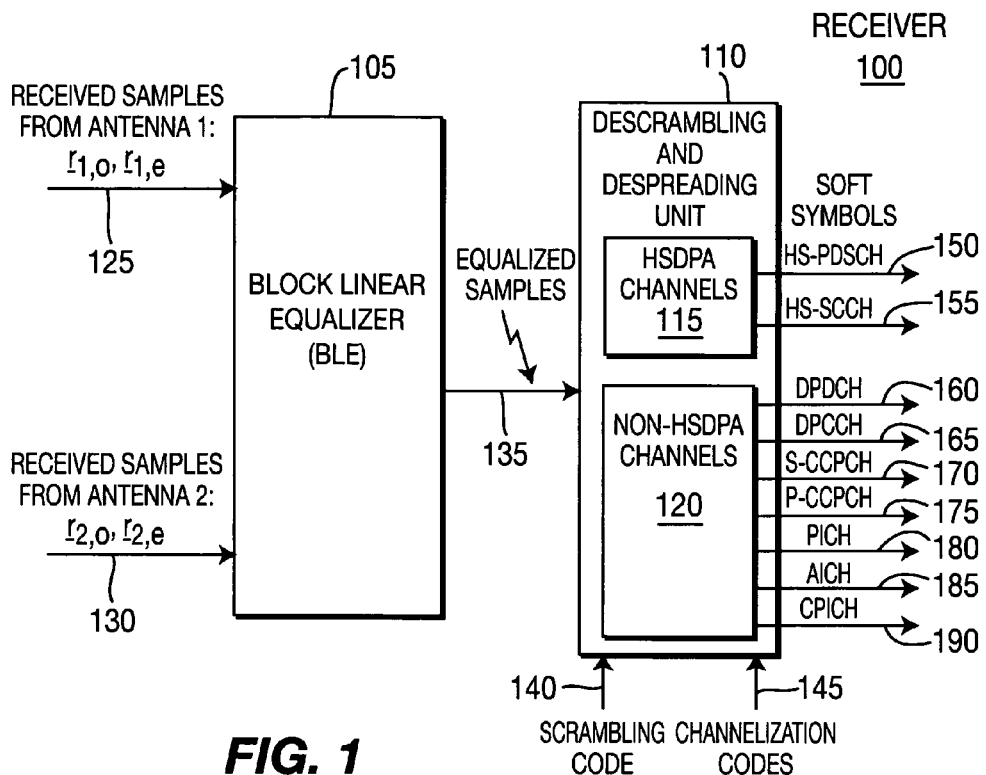
FIG. 1 is a high-level block diagram of an advanced receiver including a BLE which generates equalized samples used to process HSDPA and non-HSDPA channels in accordance with the present invention.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an IC or be configured in a circuit comprising a multitude of interconnecting components.

Acronyms
3GPP Third generation partnership project
AICH Acquisition indicator channel
BLE Block linear equalizer
CDMA Code division multiple access
CLEQ Chip level equalizer
CPICH Common pilot channel
DFT Discrete Fourier transform
DPCCH Dedicated physical control channel
DPDCH Dedicated physical data channel
EV-DO Evolution-data only
EV-DV Evolution-data and voice
FDD Frequency division duplex
FFT Fast Fourier transform
FIR Finite impulse response
HS-PDSCH High speed physical downlink shared channel
HS-SCCH High speed shared control channel for HS-DSCH
HSDPA High speed downlink packet access
IC Integrated circuit
MAI Multiple-access interference
MMSE Minimum mean square error
P-CCPCH Primary common control physical channel
PICH Paging indicator channel
S-CCPCH Secondary common control physical channel
SNR Signal-to-noise ratio
TDD Time division duplex WTRU Wireless transmit/receive unit
ZF Zero-forcing
Symbols The symbol definitions below apply unless otherwise indicated in the text.

M=Size of the middle of the block
E=Size of the edge of the block
W=Block size=M+2E
$L_{max}$=Maximum length of channel response vector in chips
L=Length of channel response vector that will be processed
N=Update rate of the channel response vector relative to the block rate. (When N=1, the matrix is inverted every W-chip block.)
$h_e^j$=Channel response vector of length $L_{max}$ or L corresponding to even samples from antenna # j.
$h_o^j$=Channel response vector of length $L_{max}$ or L corresponding to odd samples from antenna # j.
$r_e^j$ or $r_{-j,e}$=Received vector of length W containing even samples from antenna # j
$r_o^j$ or $r_{-j,o}$=Received vector of length W containing odd samples from antenna #j
$n_e^j$=Received noise vector of length W containing even samples from antenna # j
$n_o^j$=Received noise vector of length W containing odd samples from antenna # j
d=Vector of transmitted samples
$\hat{d}$=Vector of estimated received chips
$H_{j,e}$=Channel response matrix corresponding to even samples from antenna # j.
$H_{j,o}$=Channel response matrix corresponding to odd samples from antenna # j.
$T_c$=Chip duration
$\sigma^2$=Noise variance or power (actual or approximated) used in the MMSE solution.

A communication channel may be characterized by the signal-to-noise ratio (SNR), multipath, multiple-access interference (MAI), and other impairments that may be external or internal to a transmitter or receiver. For a given set of communication channel conditions the present invention has improved performance compared to a conventional Rake-based CDMA receiver by providing a lower error probability or higher data throughput. Similarly, the present invention provides a receiver with error probability performance similar to that of the Rake receiver but under poorer channel conditions and/or at a greater distance from the transmitter. In addition, the present invention provides a number of techniques for further improving the performance or reducing the computational complexity by adjusting parameters of the receiver algorithms.

The present invention uses FFT processing, which is a well-known technique for efficiently computing discrete Fourier transforms (DFTs). Wherever an FFT is used, alternative methods for computing a DFT may be substituted, (e.g., algorithms based on prime factorization or chirp-Z transforms).

The present invention is applicable to HSDPA. Parameters are set based on communication channel conditions, and the computational complexity is reduced. Although the present invention is primarily applicable to a third generation partnership project (3GPP) frequency division duplex (FDD) HSDPA system, the present invention is more generally applicable to CDMA receivers that may be used to demodulate, for example, non-HSDPA channels in the 3GPP standard, time division duplex (TDD) HSDPA and non-HSDPA signals, CDMA2000, 1×EV-DV (evolution-data and voice), and 1×EV-DO (evolution-data only).

FIG. 1 is a block diagram of an advanced receiver 100 including a BLE 105 and a descrambling and despreading unit 110 in accordance with the present invention. The descrambling and despreading unit 110 is used to demodulate CDMA channels including HSDPA channels 115 and non-HSDPA channels 120 based on a scrambling code 140 and channelization codes 145. The BLE 105 can be used to process HSDPA channels (HS-PDSCH 150 and HS-SCCH 155) and demodulate non-HSDPA channels (DPDCH 160, DPCCH 165, S-CCPCH 170, P-CCPCH 175, PICH 180, AICH 185 and CPICH 190). One BLE 105 may be used for HSDPA and non-HSDPA channels, or multiple BLEs 105 may be used. The receiver 100 uses 2× oversampling and two receive antennas. It can operate with one antenna and an arbitrary oversampling rate to receive samples 125, 130 and output equalized samples 135. It can also be readily extended to more than two antennas.

Figure 2:
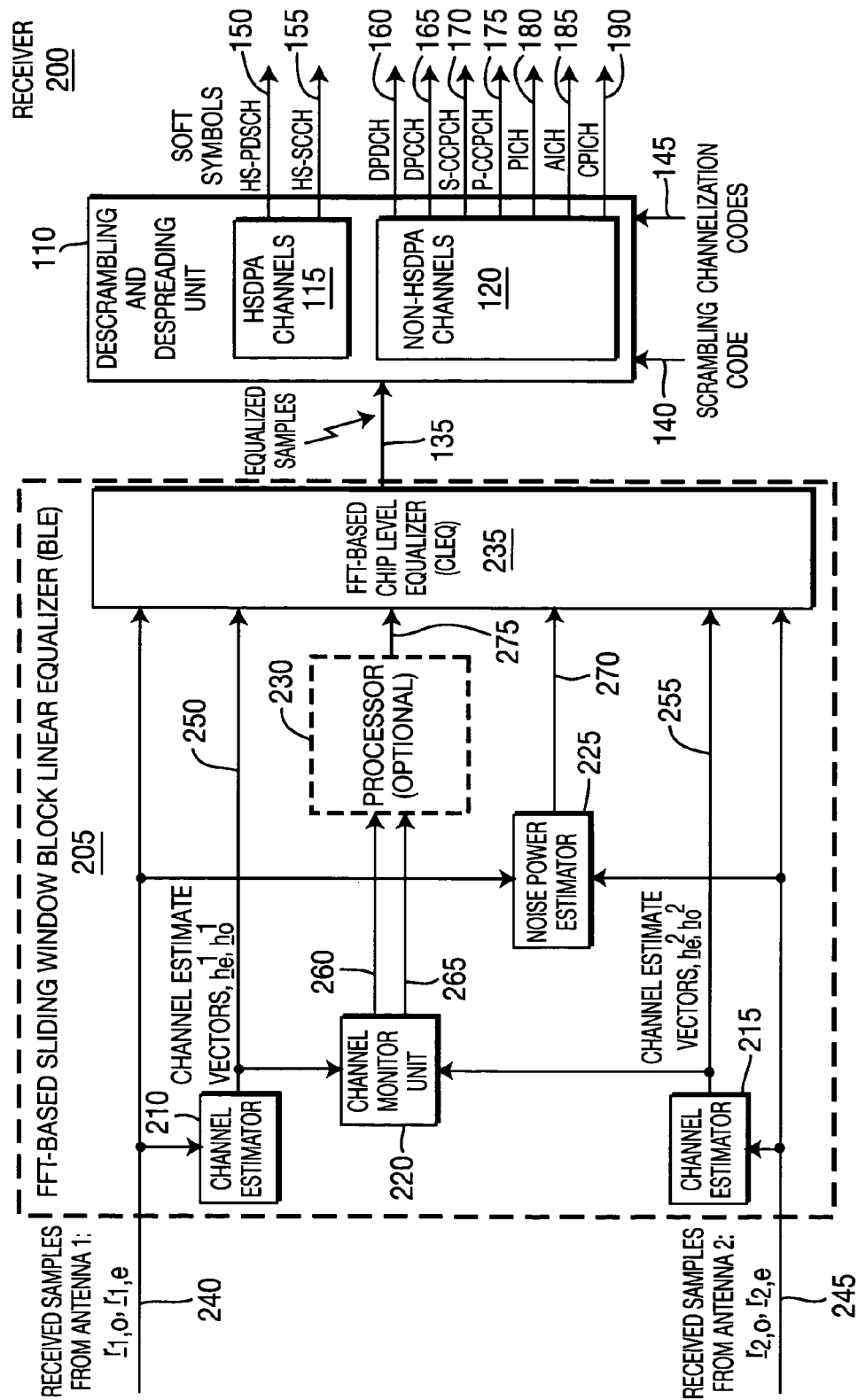
FIG. 2 is a detailed block diagram of an advanced receiver including an FFT-based sliding window BLE which includes at least one channel estimator, a channel monitor, a noise power estimator and an FFT-based CLEQ in accordance with the present invention.

FIG. 2 is a detailed block diagram of an advanced receiver 200 which includes an FFT-based sliding window BLE 205 which is used to process HSDPA channels (HS-PDSCH 150 and HS-SCCH 155) and demodulate non-HSDPA channels (DPDCH 160, DPCCH 165, S-CCPCH 170, P-CCPCH 175, PICH 180, AICH 185 and CPICH 190). Further background on FFT-based sliding window equalizers and block equalizers can be found in copending patent application Ser. No. 10/791,244 filed on Mar. 2, 2004 entitled "Reduced Complexity Sliding Window Based Equalizer" by Yang et al., which is incorporated by reference as if fully set forth herein.

The FFT-based sliding window BLE 205 of the advanced receiver 200 of FIG. 2 includes channel estimators 210 and 215, a channel monitor unit 220, a noise power estimator 225, an optional processor 230 and an FFT-based CLEQ 235.

The channel estimator 210 receives samples 240 from a sample data stream associated with a first antenna and, in response, generates a first channel estimation signal 250 including channel estimate vectors $h_e^1$, $h_o^1$ having a length, $L_{max}$.

Suppose that h(t) is an estimate of the channel impulse response, and h(k) are the samples of h(t). The even samples of h(k) are expressed as $h_e(k)$ and the odd samples of h(k) are expressed as $h_o(k)$. Here we use $h_e^1$, $h_o^1$ to represent the even and odd samples of h(k) of the first receive antenna, respectively. Since h(t) is time-limited, the number of samples of $h_e(k)$ and $h_o(k)$ is limited. $L_{max}$ is used to denote the number of samples. The received signal r(t) is sampled as r(k), (from stream 240/245). The even samples are represented as $r_e(k)$ and the odd samples are represented as $r_o(k)$.

Additionally, the channel estimator 215 receives samples 245 from a sample data stream associated with a second antenna and, in response, generates a second channel estimation signal 255 including channel estimate vectors $h_e^2$, $h_o^2$, that also have a length $L_{max}$.

Each of the first and second channel estimation signals 250, 255 are input to the channel monitor unit 220 and the FFT-based CLEQ 235. Furthermore, the received samples 240 and 245 are both input to the FFT-based CLEQ 235 and the noise power estimator 225.

In response to receiving the first and second channel estimation signals 250, 255, the channel monitor unit 220 generates a first channel monitor signal 260 including truncated channel estimate vectors. Thus, the channel monitor unit 220 shortens, (i.e., truncates), the channel estimate vectors of the first and second channel estimation signals 250, 255 to be used by the FFT-based CLEQ 235. The truncated channel estimate vectors may be identified by specifying a vector length L, where $L \leq L_{max}$. Various algorithms can be used to determine L. For example, when a threshold relative to the peak value in the channel estimate vector is set, then L can be chosen to include elements that are above the threshold.

The channel monitor signal 260 generated by the channel monitor unit 220 may also identify the start and end points of the truncated estimated vectors. For example, if the original truncated channel estimate vectors include points 1 to $L_{max}$, but there is only significant energy in points 4 to $L_{max}-7$, the channel monitor signal 260 may instruct the chip-level equalizer to only use $L_{max}-10$ points spanning position 4 to $L_{max}-7$ in each of the original channel estimate vectors 250, 255.

The channel estimators 210 and 215 may include a post-processing function that sets certain channel estimator output points to zero. Thus, the channel monitor unit 220 may select L and the start point to simply include all non-zero values.

The channel monitor unit 220 may also generate a second channel monitor signal 265 to be used by the FFT-based CLEQ 235 which indicates an approximate rate of change of the truncated channel estimate vectors included in the first channel monitor signal 260.

In wireless communications, the channel is often assumed to be a Rayleigh or other type of fading channel. The fading channel has coherence time and Doppler spread parameters, which are used to determine how fast the channel is changing with time. Therefore, the channel monitor unit 220 may estimate the coherence time or Doppler spread of the channel estimate vectors 250, 255.

The noise power estimator 225 receives each of the samples 240 and 245 and generates an estimated noise power value, $\sigma^2$, required by the MMSE solution.

The optional processor 230 may be used to determine FFT processing parameters and compute the parameters required by the FFT-based CLEQ 235, such as the update rate, N, the block size, W, and the edge size E. The processor 230 may also compute the noise power, $\sigma^2$ as an alternative to using the noise power estimator 225. In this case the noise power estimate would be derived from the channel estimate vectors 250, 255 that are provided to the channel monitor unit 220. The parameters N, W and E are programmable according to coherence time, Doppler spread, and/or power savings. The processor 230 may be optionally used to provide parameter control. If the processor 230 is not used, then one set of fixed default parameters are used by the FFT-based CLEQ 235.

The processor 230 may select parameters to provide optimum demodulation performance or to reduce the computational complexity (and hence reduce the power requirements). Furthermore, the parameters may be adapted during operation of the FFT-based CLEQ 235 as the communication channel conditions change.

The channel monitor unit 220, the noise power estimator 225, and the processor 230 are shown separately, but may be combined into a fewer number of distinct algorithms and/or components, such as on an IC chip.

In accordance with the present invention, a vector, $r=[r_0, r_1, \ldots, r_{2W-1}]^T$, contains received samples at twice (2×) the chip rate of an incoming signal. It is separated into an even received vector and an odd received vector as follows: $r_e=[r_0, r_2, \ldots, r_{2W-2}]^T$ and $r_o=[r_1, r_3, \ldots, r_{2W-1}]^T$.

When the 2× sampled channel impulse response is $[h_0, h_1, \ldots, h_{2L-1}]$, where L is the channel impulse response length in chips, the channel impulse response matrix is denoted as $$H = \begin{vmatrix} h_0 & & & \\ h_1 & h_0 & & \\ h_2 & h_1 & & \\ \vdots & h_2 & \ddots & h_0 \\ h_{2L-1} & \vdots & \ddots & h_1 \\ & h_{2L-1} & \ddots & h_2 \\ & & \ddots & \vdots \\ & & & h_{2L-1} \end{vmatrix} \quad \text{Equation (1)}$$

and is separated into an even matrix and an odd matrix as follows:

$$H_e = \begin{vmatrix} h_0 & & & \\ h_2 & h_0 & & \\ h_4 & h_2 & & \\ \vdots & h_4 & & h_0 \\ h_{2L-2} & \vdots & \ddots & h_2 \\ & h_{2L-2} & \ddots & h_4 \\ & & \ddots & \vdots \\ & & & h_{2L-2} \end{vmatrix} \quad \text{Equation (2)}$$

and $$H_o = \begin{vmatrix} h_1 & & & \\ h_3 & h_1 & & \\ h_5 & h_3 & & \\ \vdots & h_5 & & h_1 \\ h_{2L-1} & \vdots & \ddots & h_3 \\ & h_{2L-1} & \ddots & h_5 \\ & & \ddots & \vdots \\ & & & h_{2L-1} \end{vmatrix} \quad \text{Equation (3)}$$

Assuming that d is the transmitted signal vector sampled at the chip rate (1×), we have $$\begin{bmatrix} r_e \\ r_o \end{bmatrix} = \begin{bmatrix} H_e \\ H_o \end{bmatrix} d + \begin{bmatrix} n_e \\ n_o \end{bmatrix} \quad \text{Equation (4)}$$

where $n_e$ and $n_o$ are noise vectors at the even and odd sampling positions, respectively. It is assumed that the noise variance (or power) is $\sigma_n^2$.

Using the MMSE principle, the signal sample estimation is depicted as $$\hat{d} = (H_e^H H_e + H_o^H H_o + \sigma_n^2 I)^{-1}(H_e^H r_e + H_o^H r_o) \quad \text{Equation (5)}$$

where $(\cdot)^H$ is the complex conjugate transpose (or Hermitian) operation. I is a unit diagonal matrix.

For a two-antenna diversity receiver, the above development can be readily extended, where the superscripts and subscripts 1 and 2 denote the two receive antennas.

$$\begin{bmatrix} r_e^1 \\ r_o^1 \\ r_e^2 \\ r_o^2 \end{bmatrix} = \begin{bmatrix} H_{1,e} \\ H_{2,o} \\ H_{2,e} \\ H_{2,o} \end{bmatrix} d + \begin{bmatrix} n_e^1 \\ n_o^1 \\ n_e^2 \\ n_o^2 \end{bmatrix} \quad \text{Equation (6)}$$

The MMSE solution is given by $$\hat{d} = \begin{pmatrix} H_{1,e}^H H_{1,e} + H_{1,o}^H H_{1,o} + \\ H_{2,e}^H H_{2,e} + H_{2,o}^H H_{2,o} + \sigma^2 I \end{pmatrix}^{-1} \quad \text{Equation (7)}$$

$$(H_{1,e}^H r_e^1 + H_{1,o}^H r_o^1 + H_{2,e}^H r_e^1 + H_{2,o}^H r_o^1)$$

$$= (H^H H + \sigma^2 I)^{-1}$$

$$(H_{1,e}^H r_e^1 + H_{1,o}^H r_o^1 + H_{2,e}^H r_e^1 + H_{2,o}^H r_o^1)$$

The zero-forcing (ZF) solution is given by omitting the $\sigma^2 I$ terms $$\hat{d} = (H_{1,e}^H H_{1,e} + H_{1,o}^H H_{1,o} + H_{2,e}^H H_{2,e} + H_{2,o}^H H_{2,o})^{-1} \quad \text{Equation (8)}$$

$$(H_{1,e}^H r_e^1 + H_{1,o}^H r_o^1 + H_{2,e}^H r_e^1 + H_{2,o}^H r_o^1)$$

$$= (H^H H)^{-1} (H_{1,e}^H r_e^1 + H_{1,o}^H r_o^1 + H_{2,e}^H r_e^1 + H_{2,o}^H r_o^1)$$

Formulations above have been given for two-times (2×) oversampling with and without diversity. The diversity receiver, for example, processes four streams of complex baseband received data: Odd samples from antenna #1, even samples from antenna #1, odd samples from antenna #2, and even samples from antenna #2. Similar formulations can be presented for an arbitrary number of receive antennas and an arbitrary oversampling rate. The techniques described apply equally to the various sets of parameters.

Figure 3:
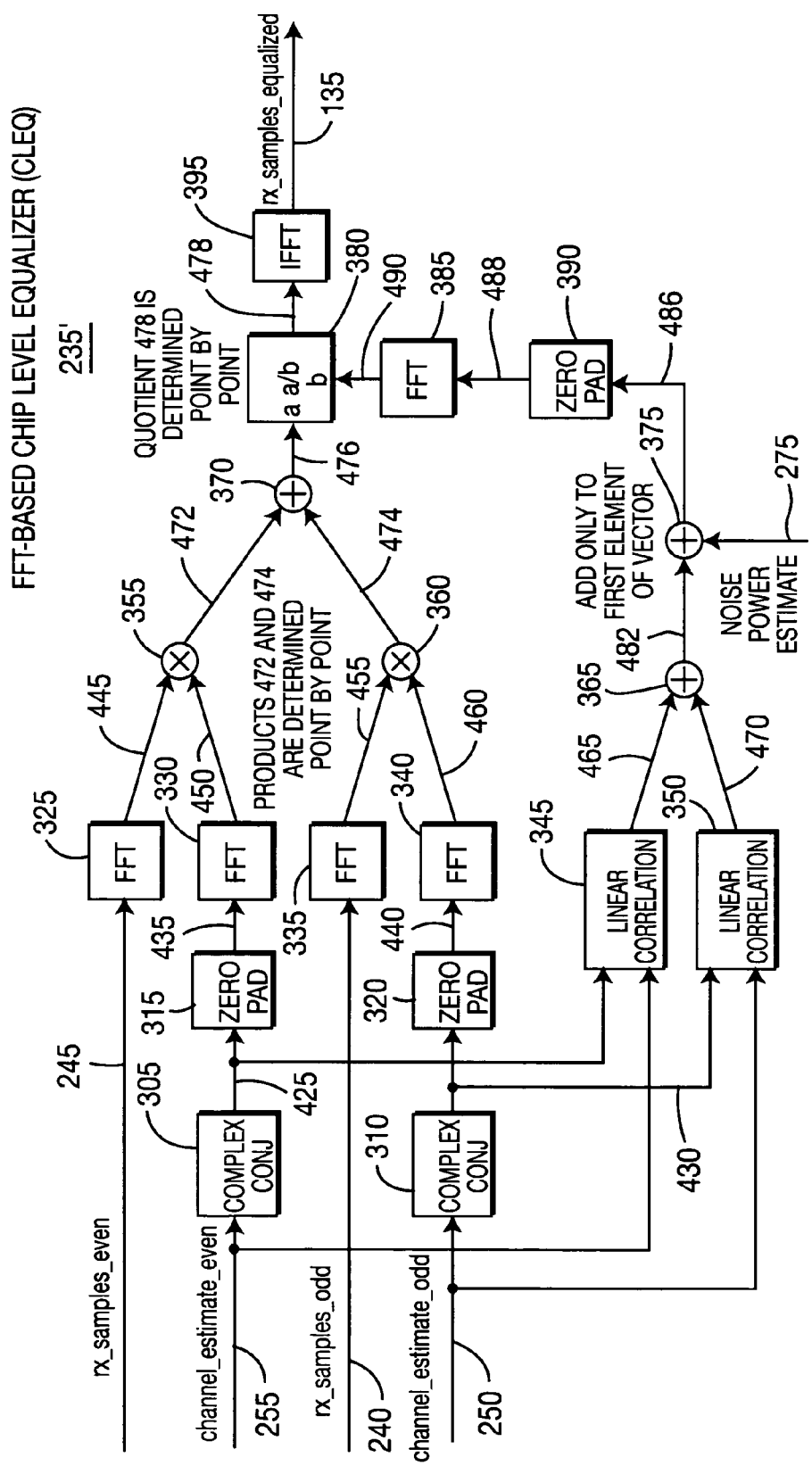
FIG. 3 is a detailed block diagram of a FFT-based CLEQ used in the receiver of FIG. 2 in accordance with one embodiment of the present invention.

The use of FFTs to efficiently evaluate Equation (5) has been previously established. FIG. 3, for example, illustrates a CLEQ architecture 235' which may be implemented in the FFT-based CLEQ 235 of the receiver 200 of FIG. 2, where $(H_e^H H_e + H_o^H H_o + \sigma_n^2 I)^{-1}$ is implemented using FFTs at the output of linear correlation operations. The CLEQ 235' includes complex conjugate operation devices 305, 310, zero padding devices 315, 320, 390, FFT operation units 325, 330, 335, 340, 385, linear correlation devices 345, 350, multipliers 355, 360, adders 365, 370, 375, a divider 380 and an inverse fast Fourier transform (IFFT) unit 395.

The channel estimates for the even received samples 255 and the channel estimates for the odd received samples 250 are input to the complex conjugate operation devices 305 and 310, respectively, which generate complex conjugate signals 425 and 430. The complex conjugate signals 425 and 430 are then input to the zero padding devices 315 and 320, correspondingly, which generate output signals 435 and 440. The output signals 435 and 440 are then input to the FFT operation units 330 and 340 to generate signals 450 and 460 accordingly.

The received even samples 245 and the received odd samples 240 are input to the FFT operation units 325 and 335, respectively, which generate output signals 445 and 455 accordingly. The signal 445 is multiplied with the signal 450 by the multiplier 355 to generate a product result signal 472. The signal 455 is multiplied with the signal 460 by the multiplier 360 to generate a product result signal 474. The product result signals 472 and 474 are added together by the adder 370 to generate a summed signal 476.

The channel estimates for the even received samples 255 and the complex conjugate signal 425 are input to the linear correlation device 345 which generates an output signal 465. The channel estimates for the odd received samples 250 and the complex conjugate signal 430 are input to the linear correlation device 350 which generates an output signal 470. The signals 465 and 470 are added together by the adder 365 to generate a summed signal 482, which is then added with the noise power estimate signal 275 by the adder 375 to generate a summed signal 486. The summed signal 486 is input to the zero padding device 390, which generates an output signal 488 on which an FFT operation is performed by the FFT operation unit 385 to generate an output signal 490. The summed signal 476 is divided by the signal 490 by the divider 380 to generate a quotient result signal 478, which is fed through the IFFT unit 395 to generate the equalized samples 135.

Figure 4:
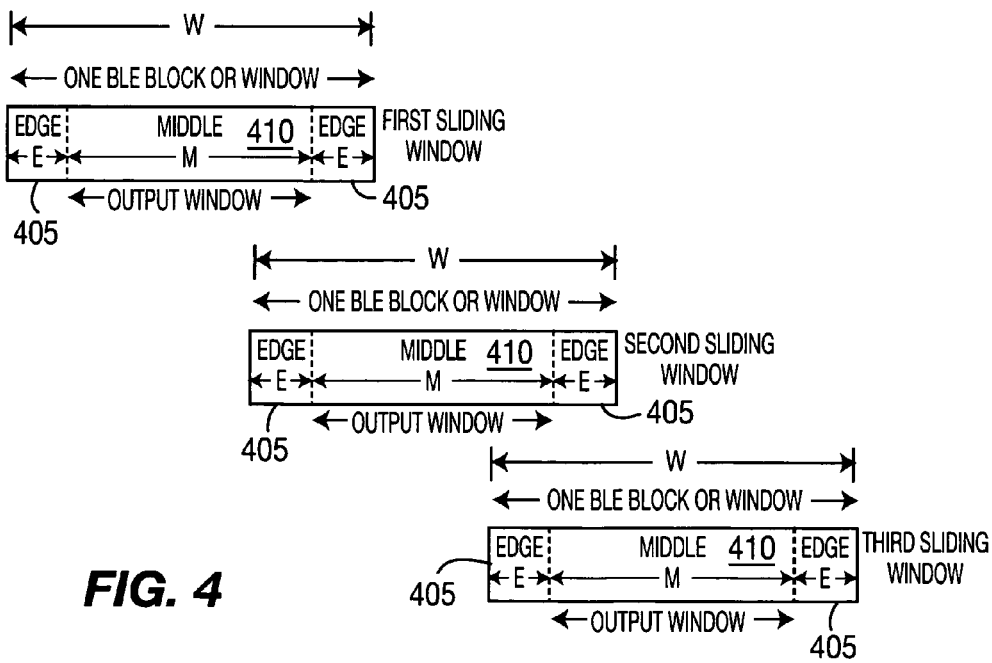
FIG. 4 shows a sliding window operation used in the BLE of FIG. 2.

FIG. 4 shows the sliding windows used to provide samples on which each FFT operation is performed in FIG. 3. The term sliding window BLE refers to the use of one-block of samples or a window-per-FFT computation where each block has an edge 405 on each end and a certain level of overlap with the preceding and subsequent blocks. A large window size can provide more samples on which to form a channel estimate, however, if the window duration is too long compared to the rate of change of the channel then the channel estimate may be poor. Alternatively, if the channel changes very slowly, then using every block to compute a channel estimate may be unnecessary and the computational complexity can be reduced by computing the channel estimate less often. The present invention adapts the window size and the rate at which the channel estimates are computed.

The overlap is necessary to accumulate enough multipath energy to adequately demodulate each block. Better demodulation performance suggests using a larger edge, minimizing the number of computations suggests using a shorter edge size. The present invention includes the ability to adapt the edge size (E) of the BLE blocks to the channel characteristic or to an acceptable level of complexity.

The block size (W)=M+2E where M is the size of the middle 410 of the block and E is the size of the edge 405 of the block. A typical design for HSDPA is W=256 and E=16, or W=512 and E=32. Other combinations of W and E are possible and adaptation over a wider range may also be used.

Figure 5:
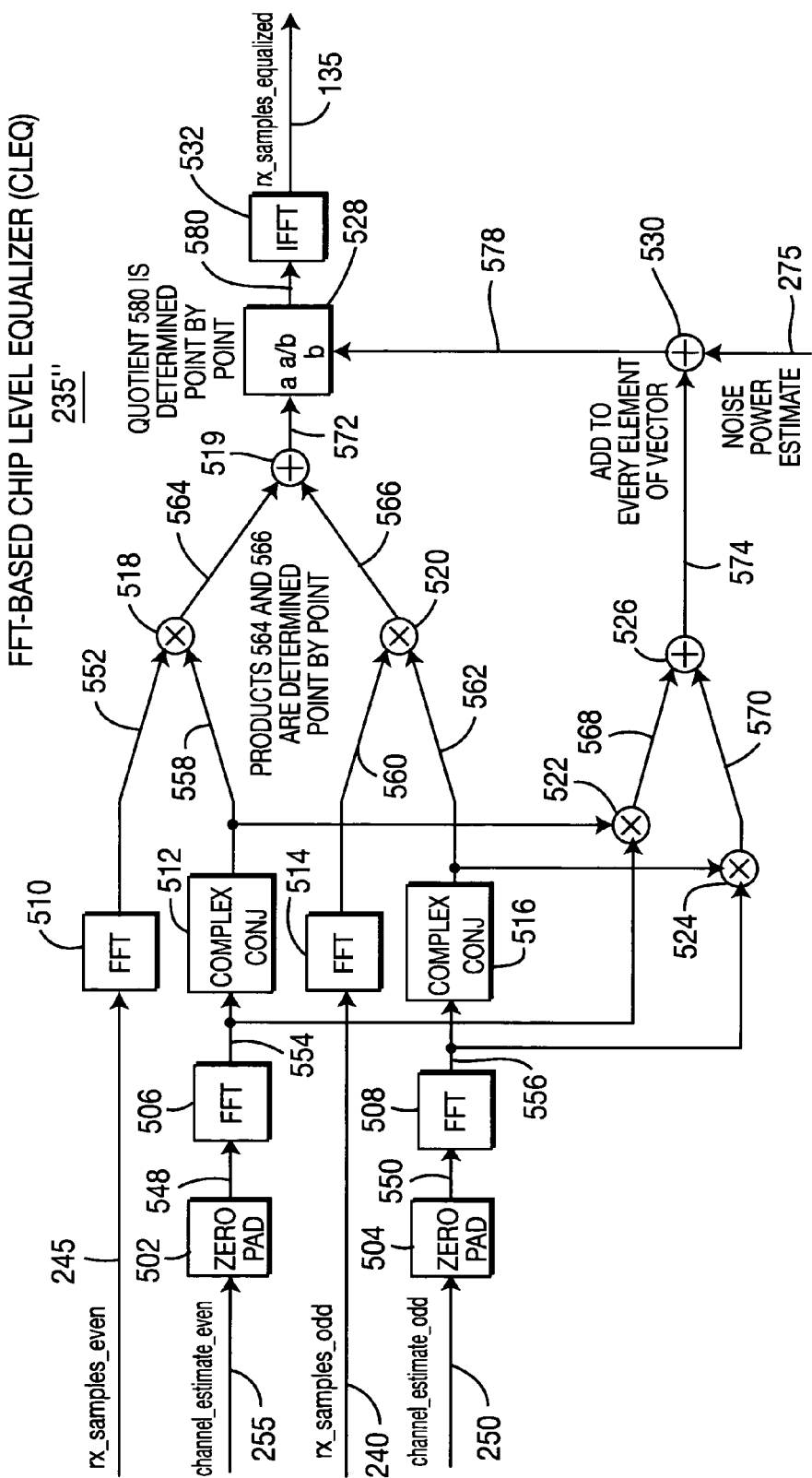
FIG. 5 is a detailed block diagram of a FFT-based CLEQ used in the receiver of FIG. 2 in accordance with another embodiment of the present invention.

FIG. 5 shows another embodiment of a CLEQ architecture 235" implemented in the FFT-based CLEQ 235 of the receiver 200 of FIG. 2. The CLEQ 235" includes zero padding devices 502, 504, FFT operation units 506, 508, 510, 514, complex conjugate operation devices 512, 516, multipliers 518, 520, 522, 524, adders 519, 526, 530, a divider 528 and an IFFT unit 532.

The channel estimates for the even received samples 255 and the channel estimates for the odd received samples 250 are input to the zero padding devices 502 and 504, respectively, which generate output signals 548 and 550. The signals 548 and 550 are then input to the FFT operation units 506 and 508, respectively, which generate output signals 554 and 556 accordingly. The signals 554 and 556 are then input to the complex conjugate operation devices 512 and 516, respectively, which generate complex conjugate signals 558 and 562 accordingly.

The received even samples 245 and the received odd samples 240 are input to the FFT operation units 510, 514, respectively, which generate output signals 552 and 560 accordingly. The signal 552 is multiplied with the complex conjugate signal 558 by the multiplier 518 to generate a product result signal 564. The signal 560 is multiplied with the complex conjugate signal 562 by the multiplier 520 generate a product result signal 566. The product result signals 564 and 566 are added together by the adder 519 to generate a summed signal 572. The signal 554 is multiplied with the complex conjugate signal 558 by the multiplier 522 to generate a product result signal 568. The signal 556 is multiplied with the signal 562 by the multiplier 524 to generate a product result signal 570. The product result signals 568 and 570 are added together by the adder 526 to generate a summed signal 574. The summed signal 574 and the noise power estimate signal 275 are added together by the adder 530 to generate a summed signal 578. The summed signal 572 is divided by the summed signal 578 by the divider 528 to generate a quotient result signal 580, which is fed through the IFFT unit 532 to generate the equalized samples 135.

The CLEQ architecture 235" eliminates the linear correlation operation and one of the FFT blocks, hence reducing the computational complexity. The diagram is shown using 2× oversampling and one receive antenna.

It can readily be extended to two or more antennas and other oversampling rates. The CLEQ architecture 235" uses an MMSE solution, but can readily be used for a ZF solution by setting the noise power to zero and/or omitting the summing node 530 with the noise estimate.

Figure 6:
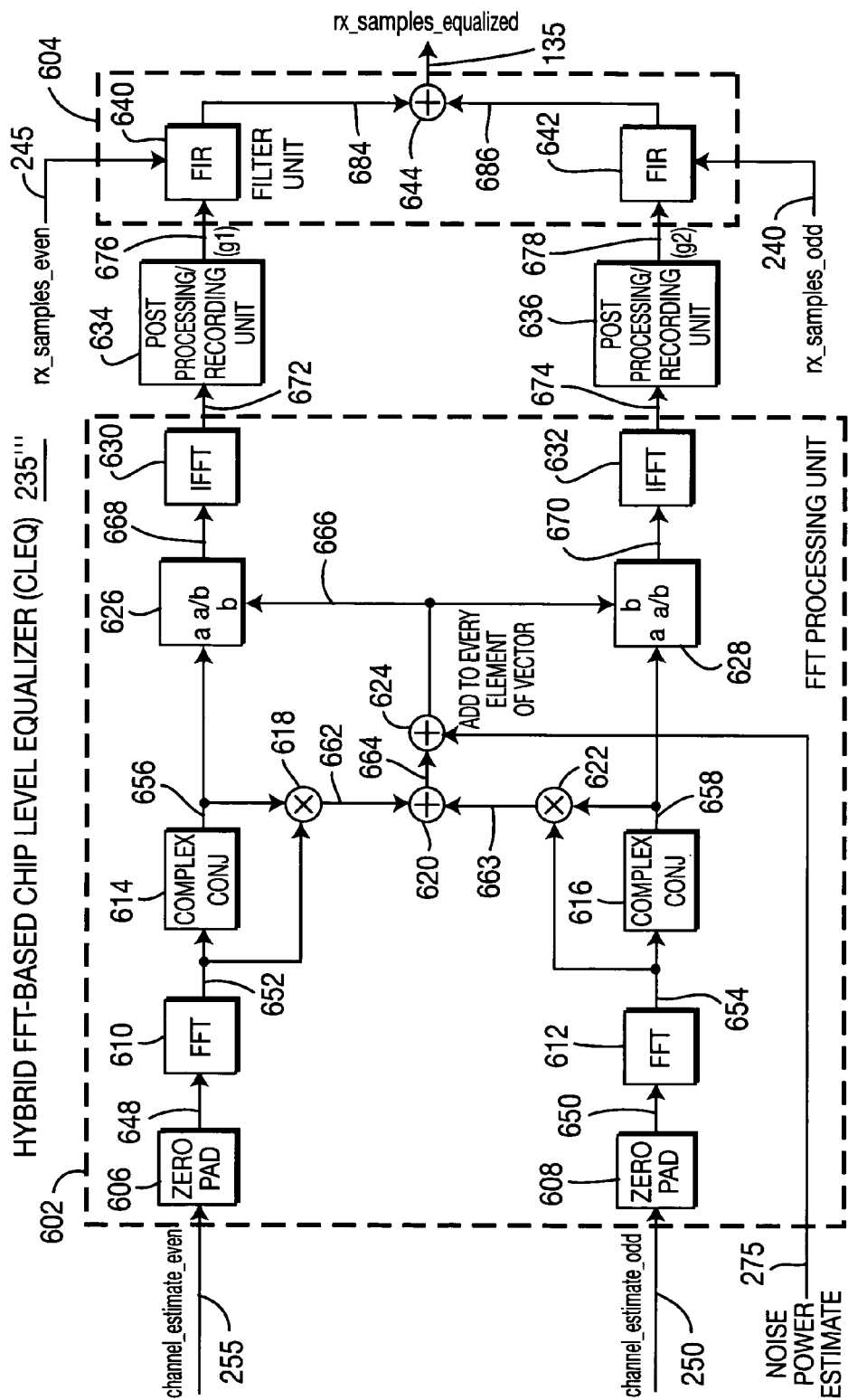
FIG. 6 is a detailed block diagram of a hybrid FFT-based CLEQ used in the receiver of FIG. 2 in accordance with yet another embodiment of the present invention.

In accordance with an alternate embodiment of the present invention, a CLEQ architecture for a 2× sampled case uses a hybrid FFT-based advanced receiver. The hybrid FFT-based advanced receiver uses a combination of FFT-based processing and time domain processing. An FFT processing unit generates tap filter coefficients that are used by a time domain FIR filter. The hybrid FFT-based advanced receiver is shown in FIG. 6, where Equations (5) and (7) are rewritten as:

$$s = \left(\sum_{i=1}^{M} H_i^H H_i + \sigma^2 I\right)^{-1} \sum_{i=1}^{M} H_i^H r_i \quad \text{Equation (9)}$$

where s is the spread data vector, (which is equivalent to the previous data vector d), $H_i$ is the channel response matrix, $r_i$, is the received vector, and M=2 for 2× sampling. For 2× sampling with 2-antenna receiver diversity, M=4 can be used. Matrix R can be denoted as $$R = \sum_{i=1}^{M} H_i^H H_i + \sigma^2 I \quad \text{Equation (10)}$$

Equation (9) can be rewritten as $$s = R^{-1} \sum_{i=1}^{M} H_i^H r_i = \sum_{i=1}^{M} R^{-1} H_i^H r_i \quad \text{Equation (11)}$$

or equivalently $$s = \sum_{i=1}^{M} G_i r_i \quad \text{Equation (12)}$$

and $$G_i = R^{-1} H_i^H \quad \text{Equation (13)}$$

Denote $\tilde{g}_i = G_i(q,:)$, the $q^{th}$ row of the matrix $G_i$. Calculation of Equation (12) can be performed in the time domain in the form of finite impulse response (FIR) filtering such as $$\sum_{i=1}^{M} \tilde{g}_i r_i. \quad \text{Equation (14)}$$

As an approximation, a single vector $g_i$ can be computed based on the block W of samples to represent the FIR coefficients for a time interval corresponding to W or longer. In that case, the equalized output can be computed by running a continuous stream of samples through the filter and changing the coefficient vector $g_i$ when a new version is computed.

A calculation of Equation (13) can be performed in frequency domain in the form of FFT and IFFT operations to provide the vector $g_i$. Let the vector si be represented as follows:

$$s_i = G_i r_i \quad \text{Equation (15)}$$

Equation (12) can be rewritten using FFT decomposition such that $$s = D_P^{-1} \left(\sum_{i=1}^{M} \Lambda_i^* \Lambda_i + \sigma^2 I\right)^{-1} \left(\sum_{i=1}^{M} \Lambda_i^* D_P r_i\right) \quad \text{Equation (16)}$$

or $$s_i = D_P^{-1} \left[\left(\sum_{i=1}^{M} \Lambda_i^* \Lambda_i + \sigma^2 I\right)^{-1} \Lambda_i^*\right] D_P r_i \quad \text{Equation (17)}$$

where $D_P$ is the P-point FFT matrix. $\Lambda_i$ is the diagonal matrix whose diagonal is the FFT of the first column of the matrix $H_i$.

Equation (17) can be rewritten as follows:

$$s_i = D_P^{-1} \Lambda_{G_i} D_P r_i \quad \text{Equation (18)}$$

where $\Lambda_{G_i}$ is the diagonal matrix whose diagonal is the FFT of the first column of the matrix $G_i$. Using Equations (17) and (18), the following is established:

$$\Lambda_{G_i} = \left(\sum_{i=1}^{M} \Lambda_i^* \Lambda_i + \sigma^2 I\right)^{-1} \Lambda_i^* \quad \text{Equation (19)}$$

Therefore $$G_i(:,1) = F^{-1}\left(\frac{F(h_i)^*}{\sum_{m=1}^{M} F(h_i)^* F(h_i) + \sigma^2}\right) \quad \text{Equation (20)}$$

where F(−) indicates the FFT operation, $F^{-1}$(−) indicates an inverse FFT, and * indicates complex conjugate. The tap coefficient vector $g_i$ can be obtained from the vector $\tilde{g}_i$, where $\tilde{g}_i = G_i(q,:)$, the $q^{th}$ row of the matrix $G_i$ by reordering and aligning the vector elements with the received signal. Alternatively the coefficient vector $g_i$ can also be obtained from $G_i(:,1)$, the first column of matrix G by circularly down-shifting the $G_i(:,1)$ by L/2 elements and take the first L elements of the circularly down-shifted $G_{i,shift}(:,1)$. Typically, the parameter value L represents the equalizer's length. The parameter value q represents the size of an over-lapping area between adjacent blocks. For example, q may be chosen to be E. In general, L and q may represent other values depending on the designs, implementations and optimizations. The value $g_i$ may be further processed by truncating the tap coefficient vector or zeroing out the noisy coefficients in the tap coefficient vector. Some post-processing functions may be implemented to filter and further process the coefficients.

Furthermore, the parameters q and L are design parameters that usually depend on the delay spread and vehicle speed, and may be optimized through simulations or other methods. For HSDPA, the preferable value of q ranges from 4 to 32 (chips) and the preferable value of L ranges from 4 to 20 (chips). Other values may also be used.

FIG. 6 shows a hybrid FFT-based CLEQ architecture 235''' implemented in the receiver 200 of FIG. 2. The CLEQ 235''' includes an FFT processing unit 602, post-processing/recording units 634, 636 and a filter unit 604. The FFT processing unit 602 includes a first input for receiving the even sample channel estimate 255, a second input for receiving the odd sample channel estimate 250, a third input for receiving the noise power estimate 275, a first output for outputting a first hybrid FFT output signal 672, and a second output for outputting a second hybrid FFT output signal 674. The FFT processing unit 602 further includes zero padding devices 606, 608, FFT operation units 610, 612, complex conjugate operation devices 614, 616, multipliers 618, 622, adders 620, 624, dividers 626, 628 and IFFT units 630, 632. The filter unit 604 includes FIR filters 640, 642 and an adder 644.

The channel estimate for the even received samples 255 and the channel estimate for the odd received samples 250 are input to the zero padding devices 606 and 608, respectively, which generate zero-padded signals 648 and 650. The zero-padded signals 648 and 650 are then input to the FFT operation units 610 and 612, correspondingly, which generate FFT-processed signals 652 and 654. The FFT-processed signals 652 and 654 are then input to the complex conjugate operation devices 614 and 616, respectively, which generate complex conjugate signals 656 and 658 correspondingly. The FFT-processed signal 652 is multiplied with the complex conjugate signal 656 by the multiplier 618 to generate a product result signal 662. Similarly, the FFT-processed signal 654 is multiplied with the complex conjugate signal 658 by the multiplier 622 to generate a product result signal 663. The product result signals 662 and 663 are added together by the adder 620 to generate a first summed signal 664, which is then added to the noise power estimate 275 by the adder 624 to generate a second summed signal 666. The complex conjugate signals 656 and 658 are each divided by the second summed signal 666 by the dividers 626 and 628, respectively, to generate quotient result signals 668 and 670. The quotient result signals 668 and 670 are then input to the respective ones of the IFFT units 630 and 632 which generate hybrid FFT output signals 672 and 674, (i.e., unprocessed filter coefficients), correspondingly.

The hybrid FFT output signals 672 and 674 are further processed using post-processing/recording units 634 and 636, which generate final tap filter coefficients 676 ($g_1$) and 678 ($g_2$). The post-processing/recording units 634 and 636 perform at least one of truncation, noise filtering, (i.e., zero out noisy coefficients), tap coefficient reordering.

The final tap coefficients 676 are used by the FIR filter 640 in the filter unit 604 to perform time domain equalization on the received even samples 245. The FIR filter 640 outputs a first equalized signal 684. The final tap coefficients 678 are used by the FIR filter 642 in the filter unit 604 to perform time domain equalization on the received odd samples 245. The FIR filter 642 outputs a second equalized signal 686. The first and second equalized signals 684 and 686 are added together by the adder 644 to generate the equalized samples 135. Alternatively, a combiner that uses maximum-ratio combining (MRC) may be used instead of the adder 644.

In FIG. 6 Equation (12) is implemented in the time domain using an FIR filter, while the FIR filter coefficients are computed using FFT operations. This embodiment of the CLEQ may be operated as a sliding window BLE by running over-lapping blocks of samples through the FIR filter as described above. Alternatively, this embodiment may operate on a continuous stream of received samples applied to the FIR filter with block processing being used only for the computing the FIR filter coefficient vectors, $g_i$.

The embodiment of FIG. 6 uses FFT-based block processing to compute the FIR filter coefficients. Other methods may be used for the block processing to compute the filter coefficients. For example, various methods for inverting matrices can be applied such as Cholesky decomposition, approximate Cholesky decomposition, and QR decomposition.

Each of FIGS. 3, 5 and 6 show an MMSE solution, but can readily be used for a ZF solution by setting the noise estimate to zero and/or omitting the summing node with the noise estimate.

Figure 7:
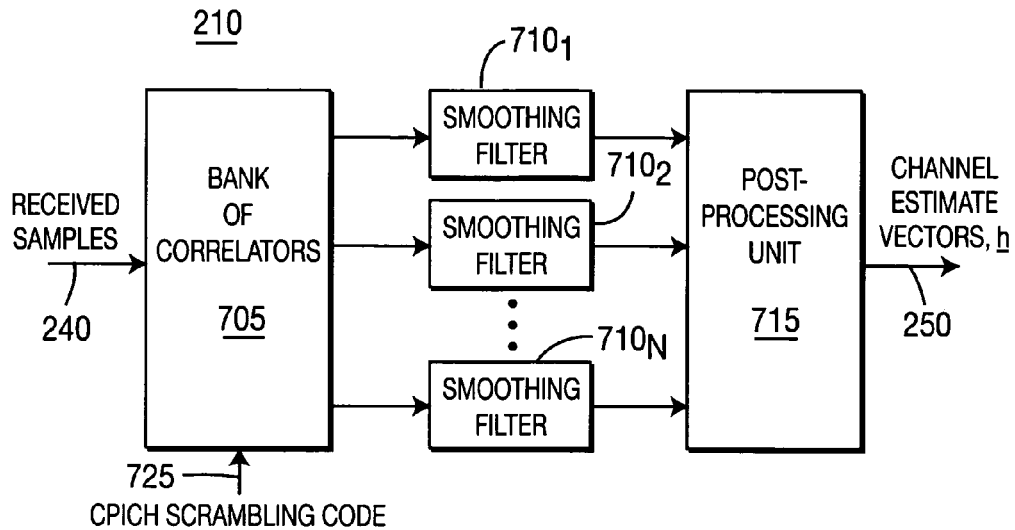
FIG. 7 is an high-level block diagram of a channel estimator of the FFT-based BLE of the receiver of FIG. 2.

FIG. 7 is a high-level block diagram of the channel estimator 210 of the FFT-based BLE 205 of the receiver 200 of FIG. 2 in accordance with one embodiment of the present invention. The channel estimator 210 includes a bank of correlators 705 for processing the received samples 240, smoothing filters $710_1$, $710_2$, ..., $710_N$ and a post-processing unit 715 which outputs channel estimate vectors 250, h. The same configuration described above applies to the channel estimator 215, except that the bank of correlators 705 would instead process the received samples 245 and output channel estimate vectors 255.

Figure 8:
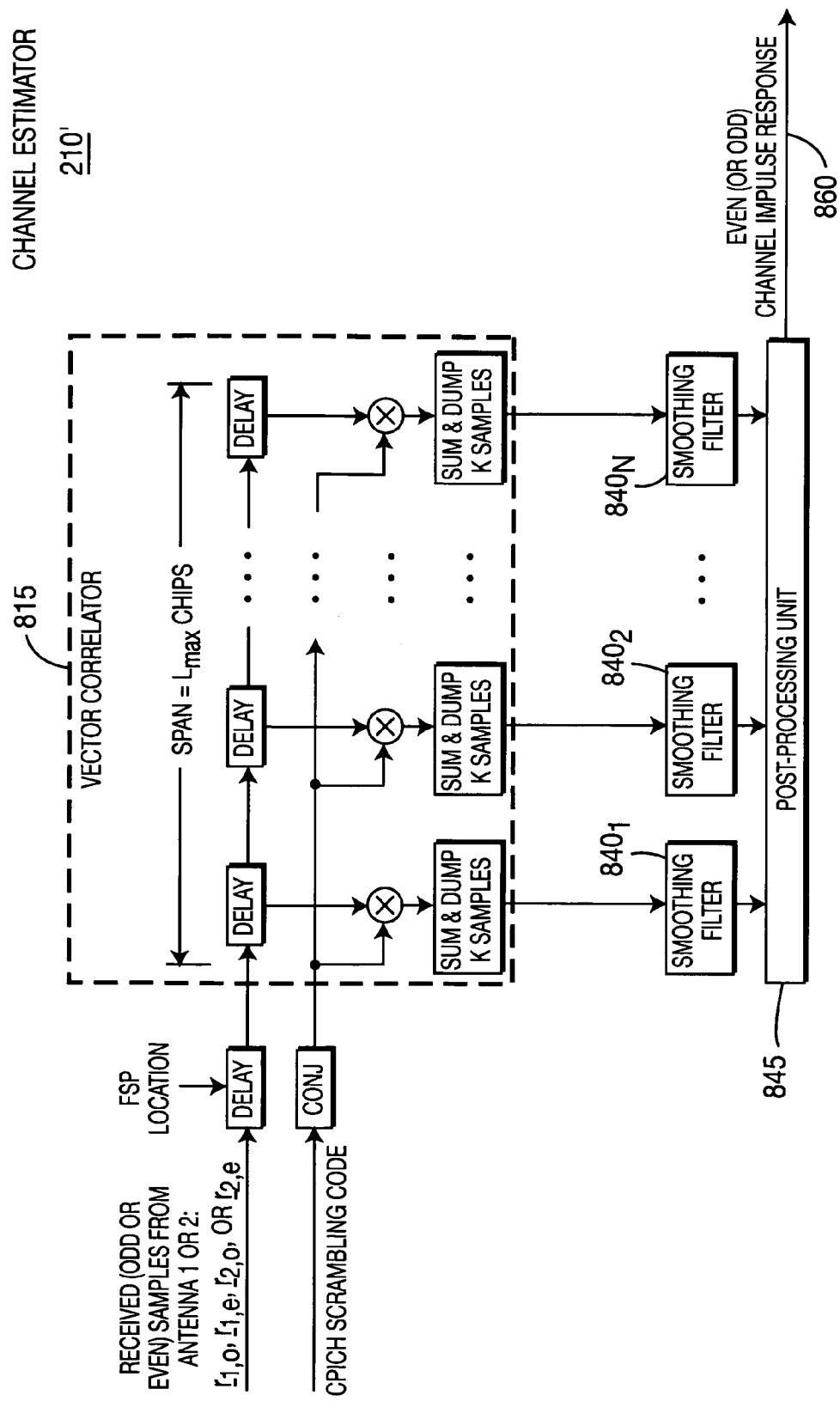
FIG. 8 is a detailed block diagram of a channel estimator similar to the one shown in FIG. 7.

FIG. 8 is a detailed block diagram of the channel estimator 210' similar to the channel estimator 210 of FIG. 7. The channel estimator 210' includes a vector correlator 815 spanning $L_{max}$ chips. A typical value of $L_{max}$ for HSDPA applications is 20 chips.

The channel estimator 210' further includes a plurality of smoothing filters $840_1$, $840_2$, ..., $840_N$ which improve each point of the channel estimate. The smoothing filters $840_1$, $840_2$, ..., $840_N$ may be block averagers, FIR filters or infinite impulse response (IIR) filters. The outputs of the smoothing filters $840_1$, $840_2$, ..., $840_N$ are fed to a post-processing unit 845 which outputs an even (or odd) channel impulse response 860. The post-processing unit 845 eliminates or minimizes the effect of noisy samples in the channel estimate vector h.

In one embodiment, the post-processing unit 845 may include an algorithm running thereon that may set a threshold, whereby all elements with a magnitude below the threshold are set to zero. The threshold may be computed as a constant, (less than 1), times the magnitude of largest element in h.

In another embodiment, the algorithm running on the post-processing unit 845 may be computed as a constant, (greater than 1), times the average magnitude, (or some approximation to the average magnitude), of all elements in h.

In yet another embodiment, two thresholds may be computed using both methods and selecting the final threshold as the larger or smaller of the two values.

Figure 9:
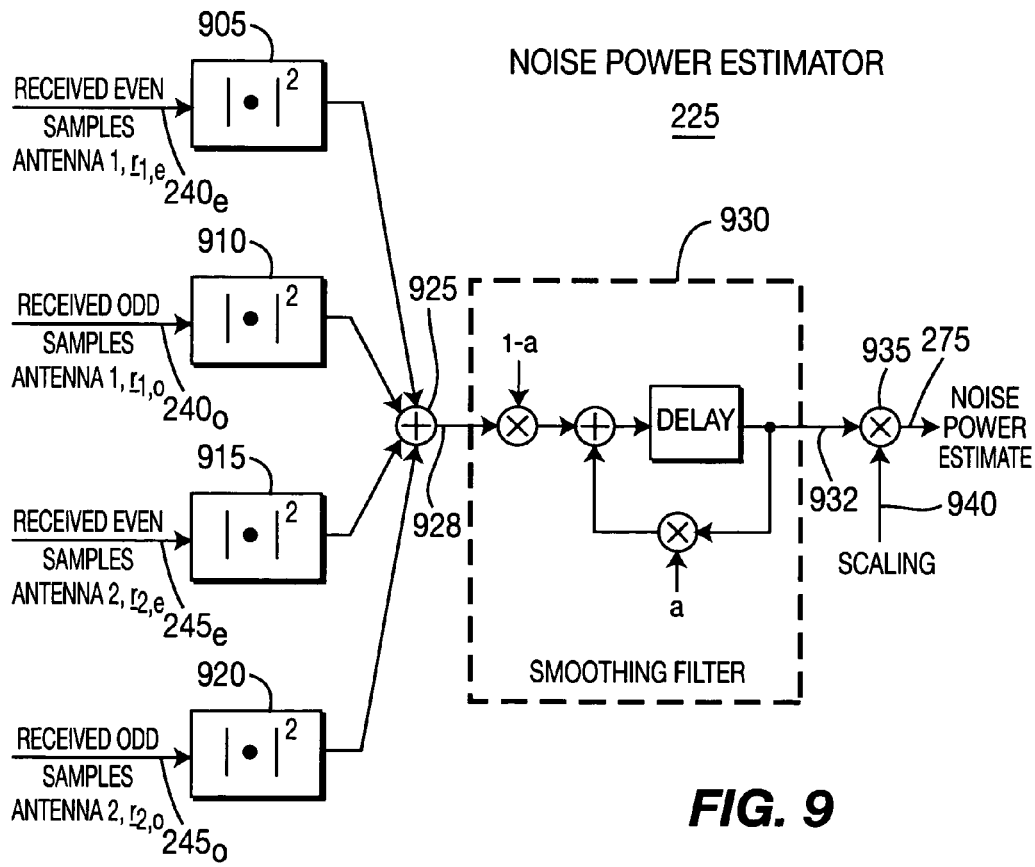
FIG. 9 is an exemplary block diagram of the noise power estimator of the FFT-based BLE of the receiver of FIG. 2.

FIG. 9 is an exemplary block diagram of the noise power estimator 225 of the FFT-based BLE 205 of the receiver 200 of FIG. 2. The noise power estimator 225 includes a plurality of magnitude processing units 905, 910, 915, 920, a summer 925, a smoothing filter 930 and a multiplier 935. The magnitude, (or approximate magnitude), of even samples $240_e$, $245_e$ and odd samples $240_o$, $245_o$ from each of two antennas is computed by magnitude processing units 905, 910, 915, 920. The processed samples output by the magnitude processing units 905, 910, 915, 920 are summed by the summer 925 to generate a summed output signal 928, which is applied to a smoothing filter 930. The multiplier 935 multiplies the output 932 of the smoothing filter 930 with a scaling constant 940 to generate the noise power estimate 275.

FIG. 10 is a block diagram of an HSDPA co-processor channel estimator 1000 in accordance with the present invention.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A receiver comprising:
a first antenna which receives a first sample data stream;
a second antenna which receives a second sample data stream;
a noise power estimator comprising:
a first magnitude processing unit configured to receive even samples associated with the first data stream;
a second magnitude processing unit configured to receive odd samples associated with the first data stream;
a third magnitude processing unit configured to receive even samples associated with the second sample data stream; and
a fourth magnitude processing unit configured to receive odd samples associated with the second sample data stream, wherein the noise power estimator generates a noise power estimate based on odd and even samples associated with each of the first and second sample data streams; and
a chip level equalizer (CLEQ) which generates equalized samples based on the noise power estimate and one-block samples of the first and second sample data streams.

2. The receiver of claim 1 further comprising:
a first channel estimator for generating a first channel estimate based on the first sample data stream; and
a second channel estimator for generating a second channel estimate based on the second sample data stream, wherein equalized samples generated by the CLEQ are further based on the first and second channel estimates.

3. The receiver of claim 2 further comprising:
a channel monitor unit which generates a first channel monitor signal including truncated channel estimate vectors based on the first and second channel estimates, and a second channel monitor signal which indicates an approximate rate of change of the truncated channel estimate vectors included in the first channel monitor signal.

4. The receiver of claim 3 wherein the CLEQ is a fast Fourier transform (FFT)-based CLEQ, the receiver further comprising:
a processor coupled between the channel monitor unit and the FFT-based CLEQ for determining FFT processing parameters for use by the FFT-based CLEQ.

5. The receiver of claim 4 wherein the parameters include an update rate, N.

6. The receiver of claim 4 wherein the parameters include a block size, W, and an edge size, E.

7. The receiver of claim 6 wherein the size of a one-block sample, W, is equal to the size of a middle, M, of the block added to two times the edge size, E, of the one-block sample.

8. The receiver of claim 6 wherein W=256 and E=16.

9. The receiver of claim 6 wherein W=512 and E=32.

10. The receiver of claim 4 wherein the parameters include a noise power, $\sigma^2$.

11. The receiver of claim 1 wherein the CLEQ is a hybrid fast Fourier transform (FFT)-based CLEQ.

12. An integrated circuit (IC) incorporated in a receiver including a first antenna which receives a first sample data stream and a second antenna which receives a second sample data stream, the IC comprising:
a noise power estimator comprising:
a first magnitude processing unit configured to receive even samples associated with the first data stream;
a second magnitude processing unit configured to receive odd samples associated with the first data stream;
a third magnitude processing unit configured to receive even samples associated with the second sample data stream; and
a fourth magnitude processing unit configured to receive odd samples associated with the second sample data stream, wherein the noise power estimator generates a noise power estimate based on odd and even samples associated with each of the first and second sample data streams; and
a chip level equalizer (CLEQ) which generates equalized samples based on the noise power estimate and one-block samples of the first and second sample data streams.

13. The IC of claim 12 further comprising:
a first channel estimator for generating a first channel estimate based on the first sample data stream; and
a second channel estimator for generating a second channel estimate based on the second sample data stream, wherein equalized samples generated by the FFT-based CLEQ are further based on the first and second channel estimates.

14. The IC of claim 13 further comprising:
a channel monitor unit which generates a first channel monitor signal including truncated channel estimate vectors based on the first and second channel estimates, and a second channel monitor signal which indicates an approximate rate of change of the truncated channel estimate vectors included in the first channel monitor signal.

15. The IC of claim 14 wherein the CLEQ is a fast Fourier transform (FFT)-based CLEQ, the IC further comprising:
a processor coupled between the channel monitor unit and the FFT-based CLEQ for determining FFT processing parameters for use by the FFT-based CLEQ.

16. The IC of claim 15 wherein the parameters include an update rate, N.

17. The IC of claim 15 wherein the parameters include a block size, W, and an edge size, E.

18. The IC of claim 17 wherein the size of a one-block sample, W, is equal to the size of a middle, M, of the block added to two times the edge size, E, of the one-block sample.

19. The IC of claim 17 wherein W=256 and E=16.

20. The IC of claim 17 wherein W=512 and E=32.

21. The IC of claim 15 wherein the parameters include a noise power, $\sigma^2$.

22. The IC of claim 12 wherein the CLEQ is a hybrid fast Fourier transform (FFT)based CLEQ.

23. In a receiver comprising (i) a noise power estimator which generates a noise power estimate based on odd and even samples associated with a first sample data stream received by a first antenna and a second sample data stream received by a second antenna, (ii) a first channel estimator which generates an even sample channel estimate based on the even samples in the first sample data stream, and (iii) a second channel estimator for generating an odd sample channel estimate based on the odd samples in the second sample data stream, a hybrid fast Fourier transform (FFT)-based chip level equalizer (CLEQ) which generates equalized samples, the hybrid FFT-based CLEQ comprising:
  an FFT processing unit including:
    a first input for receiving the even sample channel estimate;
    a second input for receiving the odd sample channel estimate;
    a third input for receiving the noise power estimate;
    a first output for outputting a first hybrid FFT output signal; and
    a second output for outputting a second hybrid FFT output signal;
  a first post-processing/recording unit coupled to the first output of the FFT processing unit for generating final tap filter coefficients associated with the even samples;
  a second post processing/recording unit coupled to the second output of the FFT processing unit for generating final tap filter coefficients associated with the odd samples;
  a first filter for performing time domain equalization on the even samples using the final tap filter coefficients associated with the even samples to generate a first equalized signal;
  a second filter for performing time domain equalization on the odd samples using the final tap filter coefficients associated with the odd samples to generate a second equalized signal; and
  an adder for adding the first and second equalized signals together to generate the equalized samples.

24. The hybrid FFT-based CLEQ of claim 23 wherein the first and second filters are finite impulse response (FIR) filters.

25. The hybrid FFT-based CLEQ of claim 23 wherein the post-processing/recording units perform at least one of truncation, noise filtering and tap coefficient reordering.

26. The hybrid FFT-based CLEQ of claim 23 wherein the FFT processing unit (-a) further comprises:
  a first zero padding device having an input coupled to the first input, the first zero padding device generating a first zero-padded signal by performing zero padding on the even sample channel estimate;
  a second zero padding device having an input coupled to the second input, the second zero padding device generating a second zero-padded signal by performing zero padding on the odd sample channel estimate;
  a first FFT operation unit having an input coupled to an output of the first zero padding device, the first FFT operation unit generating a first FFT-processed signal by performing an FFT operation on the first zero-padded signal;
  a second FFT operation unit having an input coupled to an output of the second zero padding device, the second FFT operation unit generating a second FFT-processed signal by performing an FFT operation on the second zero-padded signal;
  a first complex conjugate operation device having an input coupled to an output of the first FFT operation unit, the first complex conjugate operation device generating a first complex conjugate signal by performing a complex conjugate operation on the first FFT-processed signal;
  a second complex conjugate operation device having an input coupled to an output of the second FFT operation unit, the second complex conjugate operation device generating a second complex conjugate signal by performing a complex conjugate operation on the second FFT-processed signal;
  a first multiplier for generating a first product result signal by multiplying the first FFT-processed signal with the first complex conjugate signal;
  a second multiplier for generating a second product result signal by multiplying the second FFT-processed signal with the second complex conjugate signal;
  a first adder for generating a first summed signal by adding the first and second product result signals;
  a second adder for generating a second summed signal by adding the first summed signal and the noise power estimate to generate a second summed signal;
  a first divider for generating a first quotient result signal by dividing the first complex conjugate signal by the second summed signal;
  a second divider for generating a second quotient result signal by dividing the second complex conjugate signal by the second summed signal;
  a first inverse fast Fourier transform (IFFT) unit for generating the first hybrid FFT output signal by performing an IFFT operation on the first quotient result signal; and
  a second IFFT unit for generating the second hybrid FFT output signal by performing an IFFT operation on the second quotient result signal.

27. In a receiver comprising (i) a noise power estimator which generates a noise power estimate based on odd and even samples associated with a first sample data stream received by a first antenna and a second sample data stream received by a second antenna, (ii) a first channel estimator which generates an even sample channel estimate based on the even samples in the first sample data stream, and (iii) a second channel estimator for generating an odd sample channel estimate based on the odd samples in the second sample data stream, an integrated circuit (IC) which generates equalized samples, the IC comprising:
  an FFT processing unit including:
    a first input for receiving the even sample channel estimate;
    a second input for receiving the odd sample channel estimate;
    a third input for receiving the noise power estimate;
    a first output for outputting a first hybrid FFT output signal; and
    a second output for outputting a second hybrid FFT output signal;
  a first post-processing/recording unit coupled to the first output of the FFT processing unit for generating final tap filter coefficients associated with the even samples;

a second post processing/recording unit coupled to the second output of the FFT processing unit for generating final tap filter coefficients associated with the odd samples;

a first filter for performing time domain equalization on the even samples using the final tap filter coefficients associated with the even samples to generate a first equalized signal;

a second filter for performing time domain equalization on the odd samples using the final tap filter coefficients associated with the odd samples to generate a second equalized signal; and an adder for adding the first and second equalized signals together to generate the equalized samples.

28. The IC of claim 27 wherein the first and second filters are finite impulse response (FIR) filters.

29. The IC of claim 27 wherein the post-processing/recording units perform at least one of truncation, noise filtering and tap coefficient reordering.

30. The IC of claim 27 wherein the FFT processing unit (a) further comprises:

a first zero padding device having an input coupled to the first input, the first zero padding device generating a first zero-padded signal by performing zero padding on the even sample channel estimate;

a second zero padding device having an input coupled to the second input, the second zero padding device generating a second zero-padded signal by performing zero padding on the odd sample channel estimate;

a first FFT operation unit having an input coupled to an output of the first zero padding device, the first FFT operation unit generating a first FFT-processed signal by performing an FFT operation on the first zero-padded signal;

a second FFT operation unit having an input coupled to an output of the second zero padding device, the second FFT operation unit generating a second FFT-processed signal by performing an FFT operation on the second zero-padded signal;

a first complex conjugate operation device having an input coupled to an output of the first FFT operation unit, the first complex conjugate operation device generating a first complex conjugate signal by performing a complex conjugate operation on the first FFT-processed signal;

a second complex conjugate operation device having an input coupled to an output of the second FFT operation unit, the second complex conjugate operation device generating a second complex conjugate signal by performing a complex conjugate operation on the second FFT-processed signal;

a first multiplier for generating a first product result signal by multiplying the first FFT-processed signal with the first complex conjugate signal;

a second multiplier for generating a second product result signal by multiplying the second FFT-processed signal with the second complex conjugate signal;

a first adder for generating a first summed signal by adding the first and second product result signals;

a second adder for generating a second summed signal by adding the first summed signal and the noise power estimate to generate a second summed signal;

a first divider for generating a first quotient result signal by dividing the first complex conjugate signal by the second summed signal;

a second divider for generating a second quotient result signal by dividing the second complex conjugate signal by the second summed signal;

a first inverse fast Fourier transform (JFFT) unit for generating the first hybrid FFT output signal by performing an JFFT operation on the first quotient result signal; and a second IFFT unit for generating the second hybrid FFT output signal by performing an IFFT operation on the second quotient result signal.

* * * * *

UNITED STATES PATENT AND TRADEMARK OFFICE
CERTIFICATE OF CORRECTION

PATENT NO. : 7,570,689 B2  Page 1 of 1
APPLICATION NO. : 11/238318
DATED : August 4, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 658 days.

Signed and Sealed this

Seventh Day of September, 2010

David J. Kappos
*Director of the United States Patent and Trademark Office*